(12) United States Patent
Franks et al.

(10) Patent No.: US 8,497,657 B2
(45) Date of Patent: Jul. 30, 2013

(54) DOCKING STATION FOR ELECTRONIC DEVICE

(75) Inventors: Michael Edward Franks, Seattle, WA (US); Young Soo Kim, Bellevue, WA (US); Steven Bathiche, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 816 days.

(21) Appl. No.: 12/163,614

(22) Filed: Jun. 27, 2008

(65) Prior Publication Data

US 2009/0322278 A1 Dec. 31, 2009

(51) Int. Cl.
*H02J 7/00* (2006.01)
*H02J 7/14* (2006.01)

(52) U.S. Cl.
USPC ............ 320/108; 320/107; 320/114; 320/115

(58) Field of Classification Search
USPC ................. 320/104, 107, 115, 114, 113, 108; 455/575.1, 557, 90.3; 396/205, 301; 348/373, 348/374, 375, 376
See application file for complete search history.

(56) References Cited

U.S. PATENT DOCUMENTS

| | | | | |
|---|---|---|---|---|
| 5,850,135 | A * | 12/1998 | Kuki et al. .................... | 320/108 |
| 6,819,082 | B2 * | 11/2004 | Yang .......................... | 320/112 |
| 7,019,491 | B2 * | 3/2006 | Bozzone et al. ............. | 320/112 |
| 7,199,554 | B2 | 4/2007 | Kim et al. | |
| 7,705,558 | B2 * | 4/2010 | Silverman .................... | 320/108 |
| 7,715,187 | B2 * | 5/2010 | Hotelling et al. ........ | 361/679.41 |
| 8,169,185 | B2 * | 5/2012 | Partovi et al. ................. | 320/108 |
| 2003/0148740 | A1 * | 8/2003 | Yau et al. ......................... | 455/90 |
| 2005/0231156 | A1 * | 10/2005 | Yan ................................ | 320/107 |
| 2005/0265035 | A1 | 12/2005 | Brass et al. | |
| 2006/0070384 | A1 | 4/2006 | Ertel | |
| 2006/0261778 | A1 * | 11/2006 | Elizalde Rodarte .......... | 320/114 |
| 2007/0114967 | A1 | 5/2007 | Peng | |
| 2007/0126393 | A1 * | 6/2007 | Bersenev ...................... | 320/107 |
| 2007/0194752 | A1 | 8/2007 | McBurney | |
| 2007/0247800 | A1 | 10/2007 | Smith et al. | |
| 2008/0002350 | A1 | 1/2008 | Farrugia | |
| 2008/0090626 | A1 | 4/2008 | Griffin et al. | |
| 2008/0111518 | A1 * | 5/2008 | Toya .............................. | 320/108 |
| 2008/0258679 | A1 * | 10/2008 | Manico et al. ................ | 320/106 |
| 2008/0303479 | A1 * | 12/2008 | Park et al. ..................... | 320/108 |
| 2009/0102419 | A1 * | 4/2009 | Gwon et al. .................. | 320/108 |
| 2009/0134838 | A1 * | 5/2009 | Raghuprasad ................ | 320/108 |

OTHER PUBLICATIONS

Magnetic Cell Phone Holder at Extreme Computing, retrieved at <<http://www.extremecomputing.com/magnetholder.html>>, p. 1
Edwards 1508 Series Surface Wall Mount Electromagnetic Door Holder, Edwards Signaling, retreived at <<http://www.thesignalsource.com/documents/1508.PDF>>, p. 1.

\* cited by examiner

*Primary Examiner* — Edward Tso
*Assistant Examiner* — Alexis Boateng
(74) *Attorney, Agent, or Firm* — Allenman Hall McCoy Russell & Tuttle LLP

(57) ABSTRACT

A docking station for an electronic device includes a magnet that holds the electronic device in a mated orientation relative to the docking station. The docking station may include a mounting surface with two or more different charge-contact regions, each charge-contact region electrically coupled to a terminal of an electric power source and positioned to form an electrical connection with a charging terminal of the electronic device when the electronic device mates with the mounting surface.

18 Claims, 2 Drawing Sheets

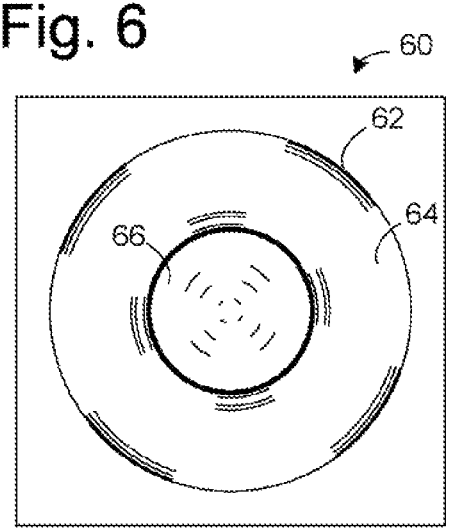
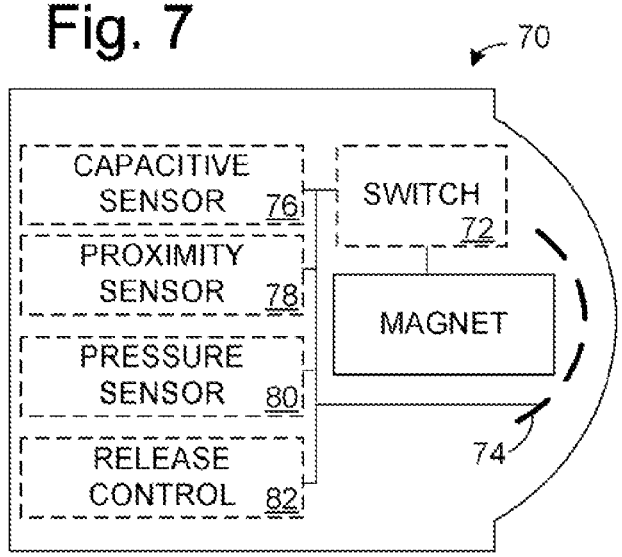

DOCKING STATION FOR ELECTRONIC DEVICE

BACKGROUND

Some battery-powered electronic devices include chargeable batteries. Such battery-powered electronic devices may be charged by docks that are configured to hold the devices while charging. The overall user experience in using such docks may be affected by the ease with which an electronic device can be put into or removed from the dock. Furthermore, docks that provide functionality above and beyond charging functionality may improve the overall user experience.

SUMMARY

A docking station for an electronic device is disclosed. The docking station includes a magnet that holds the electronic device in a mated orientation relative to the docking station. According to some aspects of the disclosure, the docking station may include a mounting surface with two or more different charge-contact regions, each charge-contact region electrically coupled to a terminal of an electric power source and positioned to form an electrical connection with a charging terminal of the electronic device when the electronic device mates with the mounting surface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 shows a plan view of another docking station in accordance with an embodiment of the present disclosure.

FIG. 7 schematically shows another docking station including mechanisms for selectively decreasing a magnetic attraction used to hold an electronic device.

DETAILED DESCRIPTION

Figure 1:
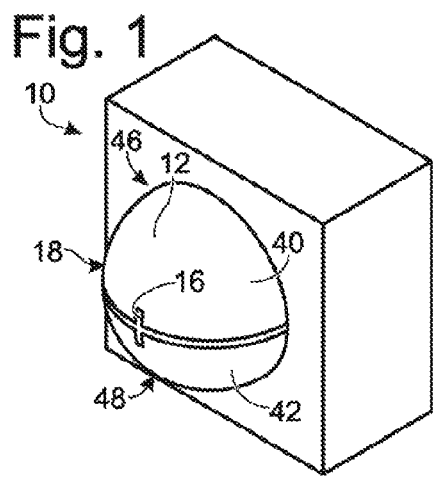
FIG. 1 somewhat schematically shows a portion of a docking station in accordance with an embodiment of the present disclosure.

FIG. 1 shows a portion of an example embodiment of a docking station 10 for an electronic device. A docking station in accordance with the present disclosure, such as docking station 10, may be used to dock a device such as a camera, a web camera, a mobile telephone, or virtually any other portable electronic device. As described in more detail below, the docking station may be configured to provide power to an electronic device and/or charge a battery or other energy storing device of the electronic device when the electronic device is docked. The docking station may also communicatively couple the electronic device to another device, such as a personal computer. In other embodiments, the electronic device may be configured to communicate directly with another device, such as via a wired (e.g., USB) or wireless (e.g., Bluetooth) connection.

A docking station in accordance with the present disclosure can include one or more different structures for positioning the docking station on a monitor, on a desk, on a wall, on an edge of a counter or cabinet, on a table, or at another desired location. For example, the docking station may include a mechanical clip, a tripod, an adhesive back, a hook-and-loop fastener, a flexible gripping member, etc. The particular type(s) of positioning structure(s) selected for a particular embodiment may be selected to correspond with a location at which the docking station is to be positioned. Virtually any positioning structure(s) can be used without hindering the mounting and charging functionality of the docking station. As such, in order to avoid obfuscating the mounting and charging functionality of the docking station, a positioning structure is not shown in the drawings.

Two or more docking stations can be set up at different locations, thus allowing a user to conveniently move an electronic device from one docking station to the next. The docking stations may be connected to a power source (e.g., plugged into a wall outlet), thus allowing the docking stations to power and/or charge the electronic devices as described below. If the electronic device is capable of wireless communication, the electronic device may communicate with a common device (e.g., personal computer) from both docking locations.

Figure 5:
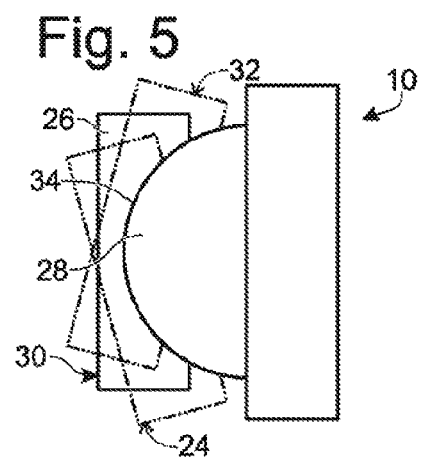
FIG. 5 schematically shows an electronic device being repositioned on another docking station in accordance with an embodiment of the present disclosure.

Docking station 10 includes a convex mounting surface 12 to selectively mate with the electronic device. The electronic device may include a complimentary mounting structure, such as a concave mounting surface with a shape that closely corresponds to the shape of convex mounting surface 12. A close correspondence between a mounting surface of a docking station and a complimentary mounting structure of the electronic device is schematically shown in FIG. 5, as described in more detail below. In other embodiments, the electronic device may not have a mounting structure that closely matches the mounting surface of the docking station. In some embodiments, a mounting surface may be treated to provide a desired coefficient of friction relative to a mounted electronic device.

Figure 2:
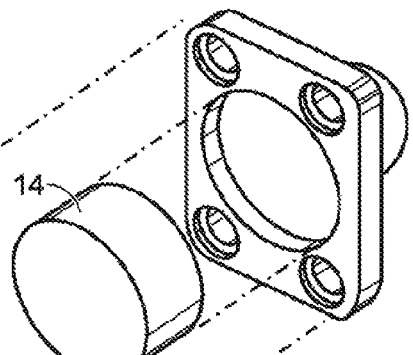
FIG. 2 shows a less schematic exploded view of the docking station of FIG. 1.
Figure 2:
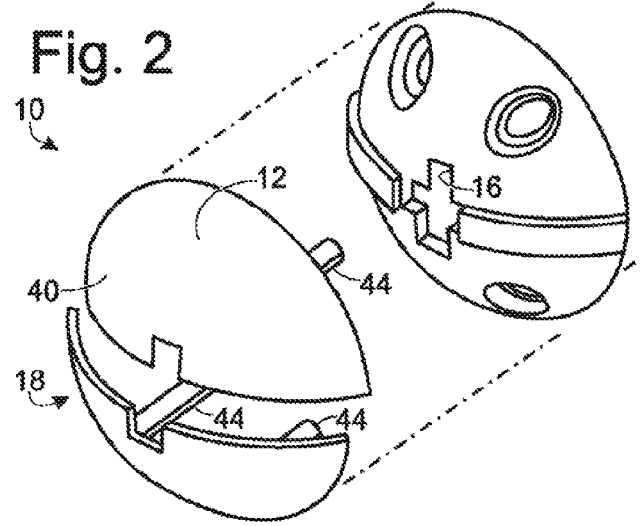

FIG. 2 shows an exploded view of docking station 10. As shown somewhat schematically in FIG. 2, docking station 10 includes a magnet 14. Magnet 14 may be configured to magnetically hold the electronic device in a mated position relative to convex mounting surface 12. Magnet 14 may include a hard or permanent magnet, a soft magnet, an electromagnet, or a combination of two or more different types of magnets. In embodiments that utilize an electromagnet, the electrical current used to establish the magnetic field may come from the same source as the current that is used to power and/or charge the electronic device.

The magnet may be selected to produce a sufficiently strong magnetic attraction for holding the electronic device in a mated position relative to convex mounting surface 12. In particular, the magnet may be selected to cooperate with a corresponding magnet, paramagnet, metal plate, or other material of the electronic device so that the electronic device is magnetically attracted to the docking station with sufficient force so as to hold the electronic device in a fixed position.

Docking station 10 of FIGS. 1 and 2 includes an alignment pocket 16 recessed from convex mounting surface 12. Alignment pocket 16 is configured to mate with an outwardly-extending alignment key of the electronic device. The mating of the alignment key into the alignment pocket registers, or self-indexes, the electronic device in a fixed position relative to the docking station. In some embodiments, the docking station may include an outwardly-extending alignment key and the electronic device may include an alignment pocket. Docking stations in accordance with the present disclosure may additionally or alternatively include other self-indexing features that provide natural alignment between the electronic device and the docking station.

In some embodiments, as shown by way of example in FIG. 5, the docking station and the electronic device may be configured to be mated in a plurality of different orientations relative to one another. As such, an alignment pocket or an alignment key may be omitted in some embodiments. When configured to allow repositioning in a plurality of different orientations, the magnetic attraction between the docking station and the electronic device may elicit an enhanced friction between the docking station and the electronic device, such friction helping to hold the electronic device in a selected one of a plurality of different possible orientations.

As shown by way of example in FIGS. 1 and 2, the convex mounting surface may be a spherical cap 18. As shown by way of example in FIG. 4, a convex mounting surface 20 may alternatively be a cylindrical cap 22. In yet other embodiments, not illustrated, a convex mounting surface may have a convex shape that is neither spherical nor cylindrical. In still other embodiments, a mounting structure that is not convex (e.g., a flat surface, a socket, a plug, etc.) may be used to selectively mate with the electronic device.

In some embodiments where the convex mounting surface is a spherical cap, the magnet may be configured to hold the electronic device in a plurality of different mated orientations relative to the spherical cap. For example, at 24 of FIG. 5, an electronic device 26 is shown held in a first mated orientation relative to a convex mounting surface 28 in the form of spherical cap. At 30 and 32, electronic device 26 is shown at two different orientations. The electronic device may be set to a desired orientation and then held in place by a magnet of the docking station. In this way, for example, a device such as a web camera can be set to view a desired field of view, or a device such as a mobile phone can be set with its display in an easy-to-view orientation.

A convex mounting surface in the form of a spherical cap may allow an electronic device to be adjusted with three degrees of freedom (i.e., roll, pitch, and yaw). In other embodiments, a convex mounting surface in the form of a spherical cap may use an alignment pocket, an alignment key, or another device to register the electronic device in a single orientation relative to the convex mounting surface. In some embodiments, a mechanical ball and socket joint, or another suitable mechanical joint, may be used to provide orientation-flexibility in addition to, or alternative of, flexibility provided by the interface between the electronic device and the mounting surface.

In some embodiments where the convex mounting surface is a cylindrical cap, the magnet can be configured to hold the electronic device in a plurality of different mated orientations relative to the cylindrical cap, as described herein with respect to the spherical cap. A convex mounting surface in the form of a cylindrical cap may allow an electronic device to be adjusted with two degrees of freedom (i.e., pitch or yaw, and scan) or one degree of freedom (i.e., pitch or yaw). Convex mounting surfaces having different shapes may offer more or fewer degrees of freedom and are within the scope of this disclosure.

An electronic device may include a complimentary mounting structure that can securely mount to the convex mounting surface in two or more different orientations. FIG. 5 shows a nonlimiting example, in which electronic device 26 includes a concave mounting structure 34 with approximately the same radius of curvature as convex mounting surface 12 of docking station 10. As another nonlimiting example (not shown), the electronic device may include a three-point (or more) mounting structure that contacts the convex mounting surface at three (or more) spaced-apart contact locations. Different portions of the mounting structure of the electronic device can be positioned to make contact with corresponding charge-contact regions of the convex mounting surface so that power may be transferred from the docking station to the electronic device.

As shown in FIGS. 1 and 2, docking station 10 includes a first charge-contact region 40 on convex mounting surface 12 and a second charge-contact region 42 on the convex mounting surface. First charge-contact region 40 is electrically coupled to a first terminal of an electric power source (not shown). The electric power source can be used to supply energy for powering and/or charging the electronic device. Further, first charge-contact region 40 is positioned to form an electrical connection with a first charging terminal of the electronic device when the electronic device mates with convex mounting surface 12. Similarly, second charge-contact region 42 can be electrically coupled to a second terminal of the electric power source and positioned to form an electrical connection with a second charging terminal of the electronic device when the electronic device mates with the convex mounting surface.

The first and second charge-contact regions can cooperate with one another to deliver energy from an electric power source to the electronic device. As such, when the electronic device is docked (e.g., magnetically held in place), it may be powered and/or recharged. The illustrated embodiment is compatible with an electronic device having a two-terminal connection. It should be understood that a different number of charge-contact regions may be used for compatibility with electronic devices having a different number of terminal connections.

Figure 3:
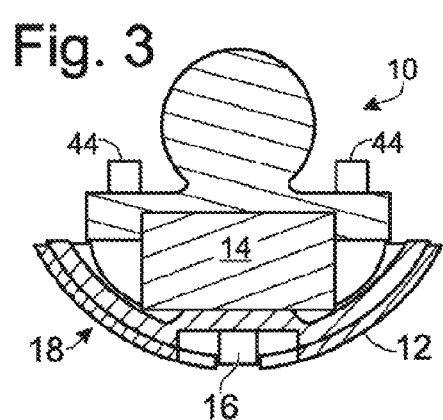
FIG. 3 shows a cross-sectional view of the docking station of FIGS. 1 and 2.

As shown in FIGS. 2 and 3, one or more electrically-conducting members 44 can extend from the charge-contact regions, behind convex mounting surface 12, to a location where they can be electrically connected to a terminal of an electric power source (e.g., via a wired connection).

The positioning of one charge-contact region relative to other charge-contact regions can be selected for compatibility with a particular electronic device. FIG. 1 illustrates first charge-contact region 40 occupying a first hemisphere 46 of the convex mounting surface and second charge-contact region 42 occupying a second hemisphere 48 of the convex mounting surface. In the illustrated embodiment, the respective hemispheres are separated by a horizontally-extending geodesic arc. In other embodiments, such hemispheres may be separated by geodesic arcs having different orientations (e.g., separating the convex mounting surface into left and right hemispheres as opposed to top and bottom hemispheres). In still other embodiments, a convex mounting surface may be divided into two or more different charge-contact regions that have shapes other than hemispheres.

Figure 4:
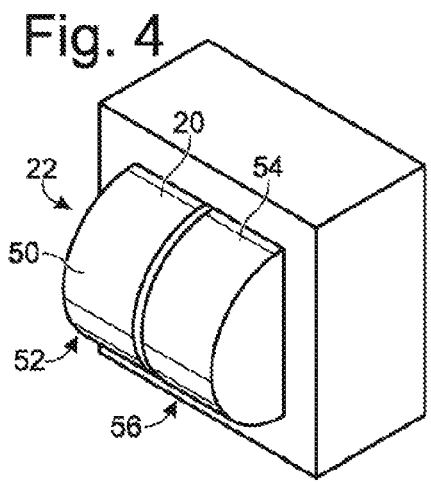
FIG. 4 shows another portion of a docking station in accordance with an embodiment of the present disclosure.

FIG. 4 illustrates first charge-contact region 50 occupying a first segment 52 of cylindrical cap 22 and second charge-contact region 54 occupying a second segment 56 of the cylindrical cap. In other embodiments, a cylindrical cap may be divided into hemispheres or another suitable arrangement.

FIG. 6 is plan view of a docking station 60 that includes a convex mounting surface 62 in the form of a spherical cap. A first charge-contact region 64 occupies an outer spherical segment of the spherical cap and a second charge-contact region 66 occupies an area interior the outer spherical segment of the spherical cap. In some embodiments, a modification of this pattern can be used, where the charge-contact regions are a pair of concentric rings.

The above arrangements are provided as examples, and other arrangements may be used without departing from the scope of the present disclosure. Furthermore, in some embodiments, charging and/or powering may be performed using inductive charging as opposed to direct conductive charging.

In some embodiments the magnetic force that holds the electronic device in a mated position may be selectively decreased and/or interrupted so as to facilitate undocking and/or repositioning of the electronic device.

For example, in some embodiments including electromagnets, the docking station may include a switch to selectively decrease an electromagnetic hold on the electronic device.

As another example, the docking station may include a magnetic shield to selectively decrease a magnetic hold on the electronic device. Such a magnetic shield may be moved into a position to disrupt a magnetic hold exerted by the magnet on the electronic device. The magnetic shield may be mechanically linked to a button or other release control that moves the magnetic shield into position responsive to activation by a user. In other embodiments, the magnetic shield may be moved by a motor or other machine responsive to input from a user and/or input from a sensor or other release control.

As yet another example, a magnet may be physically moved in order to decrease a magnetic force exerted on an electronic device. For example, a magnet may be moved away from the mounting surface and the electronic device.

FIG. 7 schematically shows a docking station 70 that includes a switch 72 and a magnetic shield 74. It should be understood that a docking station may include one, both, or neither of switch 72 and magnetic shield 74 while remaining within the scope of this disclosure. Embodiments that include one or more of switch 72 and magnetic shield 74 may optionally include one or more sensors for activating the switch and/or magnetic shield.

For example, docking station 70 may include a capacitive sensor 76 to detect a user touching one or more of the electronic device and the docking station. A magnetic hold on the electronic device can be decreased responsive to a user touching one or more of the electronic device and the docking station. For example, the capacitive sensor can be used to activate switch 72, thereby reducing a magnetic force from an electromagnet. As another example, the capacitive sensor can be used to activate magnetic shield 74 or move the magnet, thereby reducing a magnetic force from the magnet (electromagnet or otherwise).

As another example, docking station 70 may include a proximity sensor 78 to detect a user moving within a predetermined release distance of one or more of the electronic device and the docking station. A release distance may be set at virtually any desired distance, such as 1 centimeter for example. A magnetic hold on the electronic device can be decreased responsive to a user moving within the release distance of one or more of the electronic device and the docking station. For example, the proximity sensor can be used to activate switch 72, thereby reducing a magnetic force from an electromagnet. As another example, the proximity sensor can be used to activate magnetic shield 74 or move the magnet, thereby reducing a magnetic force from the magnet (electromagnet or otherwise).

As another example, docking station 70 may include a pressure sensor 80 to detect a pressure on one or more of the electronic device and the docking station exceeding a release threshold (e.g., 5 psi). A magnetic hold on the electronic device can be decreased responsive to a pressure on one or more of the electronic device and the docking station exceeding the release threshold. For example, the pressure sensor can be used to activate switch 72, thereby reducing a magnetic force from an electromagnet. As another example, the pressure sensor can be used to activate magnetic shield 74 or move the magnet, thereby reducing a magnetic force from the magnet (electromagnet or otherwise).

As another example, docking station 70 may include a release control 82 selectively switchable between a hold state and a release state. The release control may include a button, a toggle switch, or the like. A magnetic hold on the electronic device can be decreased responsive to activation of the release control. For example, the release control can be used to activate switch 72, thereby reducing a magnetic force from an electromagnet. As another example, the release control can be used to activate magnetic shield 74 or move the magnet, thereby reducing a magnetic force from the magnet (electromagnet or otherwise).

Docking stations that include a mechanism for interrupting and/or decreasing the magnetic force may facilitate repositioning and/or undocking an electronic device. With an interrupted and/or decreased magnetic attraction, the electronic device may be easily removed from the docking station and/or repositioned in a different orientation. As described above, several different types of sensors or controls can be used to automatically decrease the magnetic attraction, thus allowing a user to almost magically undock or reposition an electronic device.

When the electronic device is set in a position desired by a user, the magnetic attraction can return to full strength, thus securely holding the electronic device in a desired mated orientation. Lessening the magnetic attraction when repositioning or undocking the electronic device allows the docking station to use a less robust structure for positioning the docking station (e.g., clamps, clips, adhesives, etc.). When a user attempts to undock or reposition an electronic device while the magnetic attraction is decreased, the electronic device does not pull as hard on the docking station, and therefore, the docking station need not be as securely fastened to its supporting location (e.g., monitor, desk, table, etc.).

It should be understood that the configurations and/or approaches described herein are exemplary in nature, and that these specific embodiments or examples are not to be considered in a limiting sense, because numerous variations are possible.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:
1. A docking station for an electronic device, comprising:
a convex mounting surface to selectively mate with the electronic device;
a first charge-contact region on the convex mounting surface electrically coupled to a first terminal of an electric power source and positioned to form an electrical con- nection with a first charging terminal of the electronic device when the electronic device mates with the convex mounting surface;
a second charge-contact region on the convex mounting surface electrically coupled to a second terminal of an electric power source and positioned to form an electrical connection with a second charging terminal of the electronic device when the electronic device mates with the convex mounting surface;
a magnet to magnetically hold the electronic device in a mated position relative to the convex mounting surface, the magnet positioned behind the convex mounting surface such that the convex mounting surface at least partially wraps around the magnet; and
a capacitive sensor to detect a user touching one or more of the electronic device and the docking station, where a magnetic hold of the magnet on the electronic device is decreased responsive to a user touching one or more of the electronic device and the docking station.

2. The docking station of claim 1, where the convex mounting surface is a spherical cap.

3. The docking station of claim 2, where the magnet is configured to hold the electronic device in a plurality of different mated orientations relative to the spherical cap.

4. The docking station of claim 2, where the first charge-contact region occupies an outer spherical segment of the spherical cap and the second charge-contact region occupies an area interior the outer spherical segment of the spherical cap.

5. The docking station of claim 1, where the first charge-contact region occupies a first hemisphere of the convex mounting surface and the second charge-contact region occupies a second hemisphere of the convex mounting surface.

6. The docking station of claim 1, where the convex mounting surface is a cylindrical cap.

7. The docking station of claim 6, where the magnet is configured to hold the electronic device in a plurality of different mated orientations relative to the cylindrical cap.

8. The docking station of claim 6, where the first charge-contact region occupies a first segment of the cylindrical cap and the second charge-contact region occupies a second segment of the cylindrical cap.

9. The docking station of claim 1, where the magnet includes an electromagnet, and where the docking station further comprises a switch to selectively decrease an electromagnetic hold on the electronic device.

10. The docking station of claim 1, further comprising a physical magnetic shield moveable to selectively decrease a magnetic hold on the electronic device.

11. The docking station of claim 1, where a magnetic hold on the electronic device is decreased responsive to a user moving within a release distance of one or more of the electronic device and the docking station.

12. The docking station of claim 11, further comprising a proximity sensor to detect a user moving within the release distance of one or more of the electronic device and the docking station.

13. The docking station of claim 1, where a magnetic hold on the electronic device is decreased responsive to a pressure on one or more of the electronic device and the docking station exceeding a release threshold.

14. The docking station of claim 13, further comprising a pressure sensor to detect a pressure on one or more of the electronic device and the docking station exceeding the release threshold.

15. The docking station of claim 1, further comprising a release control selectively switchable between a hold state and a release state.

16. The docking station of claim 15, where a magnetic hold on the electronic device is decreased responsive to activation of the release control.

17. A docking station for an electronic device, comprising:
a mounting structure to selectively mate with the electronic device;
a first charge-contact region on the mounting structure electrically coupled to a first terminal of an electric power source and positioned to form an electrical connection with a first charging terminal of the electronic device when the electronic device mates with the mounting structure;
a second charge-contact region on the mounting structure electrically coupled to a second terminal of an electric power source and positioned to form an electrical connection with a second charging terminal of the electronic device when the electronic device mates with the mounting structure;
an electromagnet to electromagnetically hold the electronic device in a mated position relative to the mounting structure; and
a capacitive sensor to detect a user touching one or more of the electronic device and the docking station, where a magnetic hold of the magnet on the electronic device is decreased responsive to a user touching one or more of the electronic device and the docking station.

18. A docking station for an electronic device, comprising:
a mounting structure to selectively mate with the electronic device;
a first charge-contact region on the mounting structure electrically coupled to a first terminal of an electric power source and positioned to form an electrical connection with a first charging terminal of the electronic device when the electronic device mates with the mounting structure;
a second charge-contact region on the mounting structure electrically coupled to a second terminal of an electric power source and positioned to form an electrical connection with a second charging terminal of the electronic device when the electronic device mates with the mounting structure;
a magnet to magnetically hold the electronic device in a mated position relative to the mounting structure;
a physical magnetic shield moveable to selectively decrease a magnetic hold on the electronic device; and
a capacitive sensor to detect a user touching one or more of the electronic device and the docking station, where a magnetic hold of the magnet on the electronic device is decreased by physically moving the magnetic shield responsive to a user touching one or more of the electronic device and the docking station.

* * * * *